May 20, 1969  J. ENGLISH ET AL  3,445,673
APPARATUS FOR MEASURING OPTICAL CHARACTERISTICS
OF COATINGS ON LENSES
Filed Nov. 8, 1966
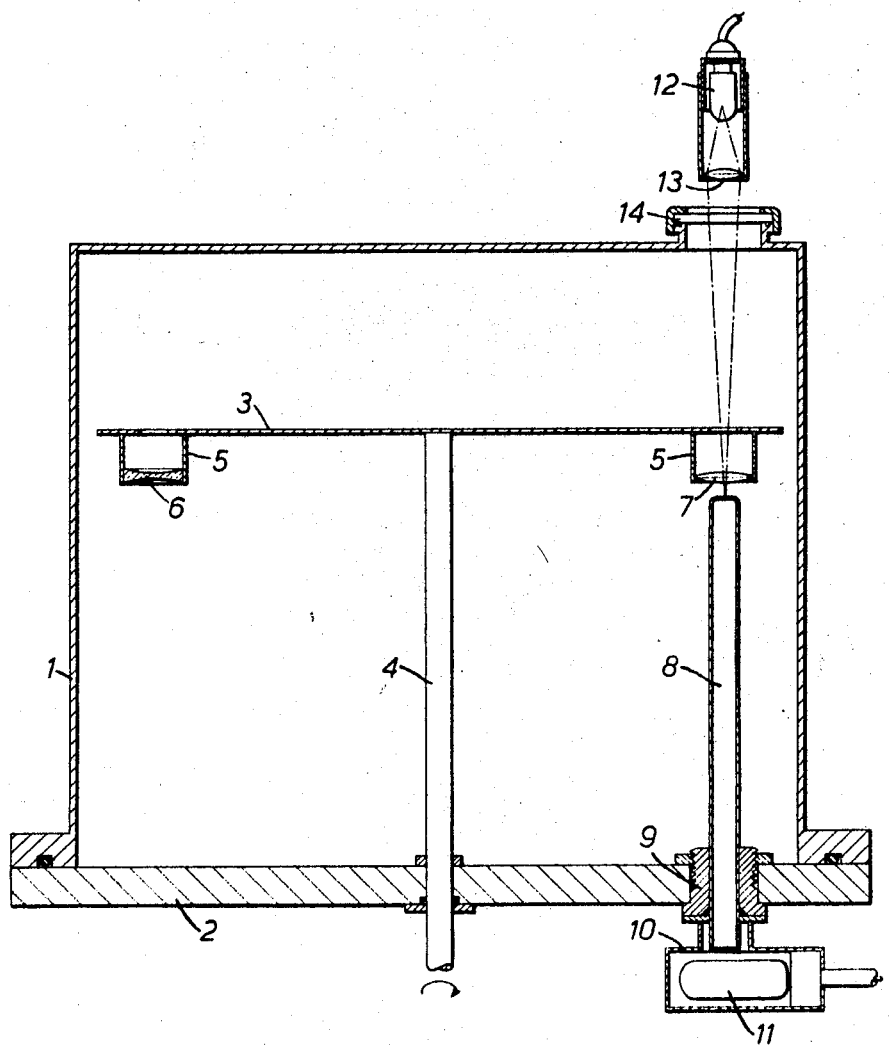
JAMES ENGLISH,
TONY I. PUTNER,
JOHN F. WATTS,
JEREMY A. HILL,
INVENTORS
BY *Hall & Houghton*
ATTORNEY 3,445,673
APPARATUS FOR MEASURING OPTICAL CHARACTERISTICS OF COATINGS ON LENSES
James English, Crawley, Tony Ian Putner, East Grinstead, John Francis Watts, Crawley, and Jeremy Allan Hill, Horsham, England, assignors to Edwards High Vacuum International Limited, Crawley, Sussex, England, a British company
Filed Nov. 8, 1966, Ser. No. 592,807
Claims priority, application Great Britain, Nov. 11, 1965, 47,890/65
Int. Cl. H01j 39/12
U.S. Cl. 250—223        8 Claims

ABSTRACT OF THE DISCLOSURE

Vacuum coating apparatus for coating ophthalmic lenses of differing focal lengths including an optical characteristic measurement device including a light source and a photocell. The light from the source which leaves the lenses in the general direction of the photocell is collected by a light guide which passes through the wall of a chamber in which the coating operation takes place and outside which the photocell is situated.

---

This invention relates to apparatus for measuring optical characteristics of coatings on lenses and particularly, though not exclusively, for measuring the optical density of coloured coatings during deposition onto ophthalmic lenses.

Colour tinting of ophthalmic lenses can be carried out under vacuum by deposition of a thin film of light absorbing material, generally a metallic oxide or mixture of metallic oxide. As each colour tint has its own particular optical density, a simple light source and a photocell light detector may be used for measuring the light transmitted through the film and lens and thus for monitoring the thickness of the film as it is deposited. Hitherto it has been usual practice to coat more than one lens at a time, each lens being held at a point on the periphery of a rotating workpiece-holder. For a suitable number of similar lenses equally spaced and rotated at a required speed, the photocell response signal reading will be stable.

A problem arises, however, when it is required to coat a number of lenses of mixed focus as the various lenses will not only interrupt the light beam but also vary the cross section of the emergent beam. Thus the area of the light beam incident upon the photocell constantly changes which causes a fluctuation of the meter reading and makes it difficult to control the optical density to a specific accuracy. The vacuum deposition conditions normally require that the photocell be located at some distance from the plane of the lenses to be coated. It will also be clear that the same problem is encountered when using an optical method for measuring film thickness during deposition of interference layers.

The present invention thus has for its object the presence of a light guide situated between a lens holder and a photocell whereby substantially all the light from a light source transmitted through a lens being tested is collected by the guide and received by the photocell.

The apparatus in accordance with the invention thus includes in combination a light source, a light responsive transducer, a focussing lens associated with said light source, said source, lens and transducer defining therebetween a light path, a light guide situated in said path and a workpiece holder, said light guide having a first end located adjacent a workpiece retaining portion of said workpiece holder and a second end located adjacent said light responsive transducer.

Preferably the light guide is a glass tube or rod aluminised on its outer surface.

A preferred embodiment of the invention will now be described in greater detail, by way of example with reference to the accompanying drawing which shows a diagrammatic representation of a lens coating apparatus incorporating a preferred embodiment of the invention.

Referring now to the drawing, a vacuum chamber 1 having a base 2 contains a lens holder 3 which may rotate about a spindle 4. Around the periphery of the lens holder 3 are a number of equally spaced lens mountings 5 suitable for holding ophthalmic lenses which may be of varying focal lengths such as those shown at 6 and 7. Mounted directly below one point in the path of such lenses is a vertical glass tube 8 aluminised on its outer surface. This tube 8, which may conveniently be replaced by a glass rod, is mounted at 9 to pass through the base 2 and to enter the cover 10 of an assembly containing a photocell 11.

Vertically above the tube 8 and outside the chamber 1 is shown a light source 12 having a focussing lens 13, the light transmitted from the focussing lens passing through a transparent portion 14 of the chamber 1 and having a focal plane substantially in that of the lens, such as 7, lying adjacent the upper end of the tube 8.

During use of the coating apparatus, continuing deposition occurs while the lens holder 3 rotates. At the same time the light source is illuminated and the beam of light is focussed substantially in the plane of the lenses being coated. Thus the emergent beam from any lens such as shown at 7 is a minimum and, as the distance between the lens shown at 7 and the tube 8 is also a minimum, substantially all of the light in the emergent beam is collected by the tube 8. The beam is then transmitted and reflected down the tube and received by the photocell 11 irrespective of the focal properties of the ophthalmic lens.

Light losses due to the optical properties of the lens do not vary enough between different lenses of similar size to become any other than a minor factor and the effect on the photocell signal reading when the lenses are rotating is insignificant.

While the light guide has been described as a glass tube or rod it is possible to replace it by another material, such as Prespex, as long as the conditions to which it is subject are compatible with such material.

We claim:
1. Coating apparatus including an evacuable chamber having mounted therein a workholder having a workpiece retaining portion, and an optical characteristic measurement device having in combination:
   (a) a window into said chamber;
   (b) a light source mounted outside said chamber adjacent said window;
   (c) a lens mounted between said window and said light source, which said lens is arranged and adapted to focus the light from said source in the region of said workpiece retaining portion;
   (d) a photocell mounted outside said chamber; and
   (e) a light guide extending from said photocell into said chamber towards said workpiece retaining portion.

2. Apparatus according to claim 1 in which said light guide comprises a glass tube having an outer surface coated with a material of high reflectance.

3. Apparatus according to claim 2 in which said tube is aluminised on said outer surface.

4. Apparatus according to claim 1 in which said light guide comprises a glass rod having an outer surface coated with a material of high reflectance.

5. Apparatus according to claim 4 in which said tube is aluminised on said outer surface.

6. Apparatus according to claim 1 in which said workpiece holder is rotatable and is provided with a plurality of workpiece retaining portions.

7. Apparatus according to claim 2 in which said light responsive transducer is a photocell.

8. Optical coating apparatus including in combination:
   (a) an evacuable chamber;
   (b) a rotatable workpiece holder having a plurality of lens retaining portions rotatable with the holder in the same plane, said holder having a first side and a second side;
   (c) a window into said chamber;
   (d) a light source mounted outside said chamber adjacent said window;
   (e) a lens mounted between said light source and said window, said lens being arranged and adapted to direct the light from said source towards said first side of said holder;
   (f) a photocell mounted outside said chamber; and
   (g) a light guide extending from said photocell into said chamber towards said second side of said holder.

References Cited

UNITED STATES PATENTS

| | | | |
|---|---|---|---|
| 2,196,867 | 4/1940 | Knoop | 250—227 |
| 3,307,020 | 2/1967 | Cahill | 250—227 |

JAMES W. LAWRENCE, *Primary Examiner.*

D. O'REILLY, *Assistant Examiner.*

U.S. Cl. X.R.

118—9, 49; 250—227; 350—96